(12) United States Patent
Paddon et al.

(10) Patent No.: US 9,106,623 B2
(45) Date of Patent: Aug. 11, 2015

(54) METHOD AND APPARATUS FOR TRANSMITTING BULK EMERGENCY DATA WHILE PRESERVING USER PRIVACY

(75) Inventors: Michael W. Paddon, Tokyo (JP); Craig M. Brown, Harbord (AU); Craig W. Northway, Aspley (AU); Jessica M. Purser, Ashfield (AU)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 13/100,861

(22) Filed: May 4, 2011

(65) Prior Publication Data
US 2012/0284511 A1 Nov. 8, 2012

(51) Int. Cl.
| | |
|---|---|
| H04L 29/06 | (2006.01) |
| H04W 4/02 | (2009.01) |
| H04W 4/22 | (2009.01) |
| H04W 12/02 | (2009.01) |
| H04W 12/04 | (2009.01) |

(52) U.S. Cl.
CPC ............ *H04L 63/0435* (2013.01); *H04W 4/02* (2013.01); *H04W 4/22* (2013.01); *H04W 12/02* (2013.01); *H04W 12/04* (2013.01)

(58) Field of Classification Search
CPC .......................... H04L 63/0435; H04W 12/02
USPC ......................... 380/270, 255, 259
See application file for complete search history.

(56) References Cited

U.S. PATENT DOCUMENTS

| | | | |
|---|---|---|---|
| 6,580,981 | B1 | 6/2003 | Masood |
| 7,598,855 | B2 | 10/2009 | Scalisi et al. |
| 7,778,622 | B2 | 8/2010 | Su |
| 7,929,010 | B2 | 4/2011 | Narasimhan |
| 2002/0012323 | A1* | 1/2002 | Petite et al. ............ 370/252 |
| 2002/0034960 | A1* | 3/2002 | Muranaga ............ 455/517 |

(Continued)

FOREIGN PATENT DOCUMENTS

| | | |
|---|---|---|
| EP | 1113678 A2 | 7/2001 |
| JP | 2003003773 A | 1/2003 |

(Continued)

OTHER PUBLICATIONS

Wu et al.; WAITER: A Wearable Personal Healthcare and Emergency Aid System; Published in: Pervasive Computing and Communications; 2008; PerCom 2008. Sixth Annual IEEE International Conference on; Date of Conference: Mar. 17-21, 2008; pp. 680-685; IEEE Xplore.*

(Continued)

*Primary Examiner* — Bradley Holder
(74) *Attorney, Agent, or Firm* — Won Tae C. Kim

(57) ABSTRACT

Systems and methods are described for performing bulk transmissions of information (e.g., emergency information, etc.) while preserving user privacy. An example mobile device described herein includes an information aggregation module configured to compile first information associated with the device, the first information including location-related information, an encryption module communicatively coupled to the information aggregation module and configured to encrypt the first information using at least one session key, and a transmitter communicatively coupled to the encryption module and configured to transmit encrypted first information to at least one receiver prior to a triggering event and to transmit the at least one session key to the at least one receiver after the triggering event.

50 Claims, 6 Drawing Sheets

(56) References Cited

U.S. PATENT DOCUMENTS

| | | | |
|---|---|---|---|
| 2003/0125010 A1* | 7/2003 | Jung | 455/404 |
| 2004/0072583 A1* | 4/2004 | Weng | 455/456.3 |
| 2004/0081139 A1* | 4/2004 | Beckmann et al. | 370/352 |
| 2004/0106415 A1 | 6/2004 | Maeda et al. | |
| 2004/0203574 A1* | 10/2004 | Chin et al. | 455/404.1 |
| 2005/0085257 A1* | 4/2005 | Laird et al. | 455/550.1 |
| 2005/0174229 A1* | 8/2005 | Feldkamp et al. | 340/506 |
| 2005/0239477 A1* | 10/2005 | Kim et al. | 455/456.1 |
| 2006/0066445 A1* | 3/2006 | Lo | 340/286.01 |
| 2006/0178128 A1* | 8/2006 | Eaton et al. | 455/404.1 |
| 2006/0276168 A1* | 12/2006 | Fuller et al. | 455/404.2 |
| 2007/0054688 A1* | 3/2007 | Yang et al. | 455/521 |
| 2007/0082653 A1* | 4/2007 | Rizzi | 455/404.2 |
| 2007/0126572 A1* | 6/2007 | Wadman | 340/539.13 |
| 2007/0139182 A1* | 6/2007 | O'Connor et al. | 340/521 |
| 2007/0142049 A1* | 6/2007 | Chae et al. | 455/435.2 |
| 2008/0003975 A1* | 1/2008 | Kim et al. | 455/404.1 |
| 2008/0166992 A1* | 7/2008 | Ricordi et al. | 455/404.2 |
| 2008/0227427 A1* | 9/2008 | Kadavallur et al. | 455/403 |
| 2008/0242261 A1* | 10/2008 | Shimanuki et al. | 455/404.2 |
| 2009/0045779 A1 | 2/2009 | Sherman et al. | |
| 2009/0080661 A1* | 3/2009 | Brown et al. | 380/279 |
| 2009/0124232 A1* | 5/2009 | D'Arcy et al. | 455/404.2 |
| 2009/0219921 A1* | 9/2009 | Beinroth et al. | 370/352 |
| 2009/0247114 A1* | 10/2009 | Sennett et al. | 455/404.1 |
| 2009/0307720 A1* | 12/2009 | Turner | 725/33 |
| 2010/0120392 A1* | 5/2010 | Youn et al. | 455/404.1 |
| 2010/0159824 A1 | 6/2010 | Goodjohn | |
| 2010/0234071 A1 | 9/2010 | Shabtay et al. | |
| 2012/0271380 A1* | 10/2012 | Roberts et al. | 607/60 |
| 2013/0344842 A1 | 12/2013 | Mcdonald | |

FOREIGN PATENT DOCUMENTS

| | | |
|---|---|---|
| JP | 2004072412 A | 3/2004 |
| JP | 3853316 | 12/2006 |
| JP | 2009518958 A | 5/2009 |
| JP | 2009176293 A | 8/2009 |
| JP | 2009301457 A | 12/2009 |
| WO | 2004028184 A1 | 4/2004 |

OTHER PUBLICATIONS

Malladi et al.; Current and future applications of mobile and wireless networks; Published in: Magazine Communications of the ACM; CACM Homepage archive vol. 45 Issue 10, Oct. 2002; pp. 144-146; ACM Digital Library.*

International Search Report and Written Opinion—PCT/US2012/036200—ISA/EPO—Aug. 30, 2012.

* cited by examiner

METHOD AND APPARATUS FOR TRANSMITTING BULK EMERGENCY DATA WHILE PRESERVING USER PRIVACY

BACKGROUND

Wireless communication devices are incredibly widespread in today's society. For example, people use cellular phones, smart phones, personal digital assistants, laptop computers, pagers, tablet computers, etc. to send and receive data wirelessly from countless locations. Moreover, advancements in wireless communication technology have greatly increased the versatility of today's wireless communication devices, enabling users to perform a wide range of tasks from a single, portable device that conventionally required either multiple devices or larger, non-portable equipment.

In an emergency during which an operable mobile communications device is present, it is desirable to communicate information to one or more entities that are capable of responding to the emergency. This information can include, for example, the location of the emergency, network properties associated with the mobile device and/or its surrounding area, or other information to assist in responding to the emergency. Communication of this information in response to an emergency results in increased consumption of device resources, such as communication bandwidth, battery charge, etc., upon indication of the emergency. A user of a mobile device may wish to provide as much information as possible during an emergency due to the intrinsically unpredictable nature of some emergency events. In contrast, it is desirable to minimize the resource usage of a mobile device in an emergency situation to the extent possible, e.g., to ensure that communication functionality of the mobile device remains available in order to minimize the risk of increased harm to persons or property associated with the emergency.

SUMMARY

An example of a mobile device includes an information aggregation module configured to compile first information associated with the device including location-related information, an encryption module communicatively coupled to the information aggregation module and configured to encrypt the first information using at least one session key, and a transmitter communicatively coupled to the encryption module and configured to transmit encrypted first information to at least one receiver prior to a triggering event and to transmit the at least one session key to the at least one receiver after the triggering event.

Implementations of such a mobile device may include one or more of the following features. The transmitter is further configured to regularly transmit the encrypted first information. The transmitter is further configured to conduct an automatic on-demand transmission of the at least one session key in response to the triggering event. The transmitter is further configured to transmit the encrypted first information according to a transmission schedule. The transmitter is further configured to embed the encrypted first information into transmissions of second information separate from the first information. The triggering event includes at least one of a call initiated by the device and directed to an emergency number, receipt of a triggering signal, or a triggering action performed by a user of the device. The receiver includes at least one of a disparate mobile device, a base station or an emergency response entity. The encryption module is further configured to encrypt the first information according to a cipher suite and the transmitter is further configured to transmit information relating to the cipher suite to the at least one receiver after the triggering event.

Implementations of such a mobile device may additionally or alternatively include one or more of the following features. The information aggregation module is further configured to compile at least one of satellite navigation information, network cell identifiers, network cell strengths, wireless access point identifiers, wireless access point strengths, compass readings or accelerometer readings. The first information further includes network-related information. The network-related information includes at least one of call records, data flow records or network topology observations associated with the device. The information aggregation module is further configured to compile information from one or more medical monitoring sensors associated with a user of the device. The transmitter is further configured to transmit the encrypted first information if the device is in an idle state or if a battery charge level of the device is above a threshold. The encryption module is further configured to discard the at least one session key upon transmission of the at least one session key to the at least one receiver. The encryption module is further configured to encrypt the first information using a second session key in response to discarding of a first session key, where the first session key differs from the second session key. The encryption module is configured to encrypt a first subset of the first information using a first session key and to encrypt a second subset of the first information using a second session key, thereby obtaining a first encrypted information subset and a second encrypted information subset, respectively. The transmitter is configured to transmit the first encrypted information subset to a first receiver and to transmit the second encrypted information subset to a second receiver.

An example of a method of securely transmitting emergency information includes compiling first information associated with a mobile device including location-related information; encrypting the first information using at least one session key to obtain encrypted information; prior to a triggering event, transmitting the encrypted information to at least one receiver; and after the triggering event, transmitting the at least one session key to the at least one receiver.

Implementations of such a method may include one or more of the following features. Transmitting the encrypted information includes regularly transmitting the encrypted information. Transmitting the encrypted information includes transmitting the encrypted information according to a transmission schedule. Transmitting the encrypted information includes embedding the encrypted information into transmissions of second information that is separate from the first information and the encrypted information. The triggering event includes at least one of a call placed to an emergency number, receipt of a triggering signal, or a triggering action performed by a user of the mobile device. Encrypting the first information includes encrypting the first information based on a selected cipher suite and the method further includes, after the triggering event, transmitting information relating to the selected cipher suite to the receiver.

Implementations of such a method may additionally or alternatively include one or more of the following features. The location-related information includes at least one of satellite navigation data, network cell identifiers, network cell strengths, wireless access point identifiers, wireless access point strengths, compass readings or accelerometer readings. The first information further includes network-related information. The network-related information includes at least one of call records, data flow records or network topology observations. Transmitting the encrypted information includes transmitting the encrypted information if the mobile device is in an idle state or if a battery charge level of the mobile device is above a threshold. Discarding the at least one session key upon transmitting the at least one session key. After the triggering event, disabling a low battery charge shutoff mechanism associated with the mobile device. Encrypting the first information includes encrypting at least a first portion of the first information using a first session key and encrypting at least a second portion of the first information using a second session key. Transmitting the at least one session key includes transmitting the first session key to at least a first receiver and transmitting the second session key to at least a second receiver.

Another example of a mobile device includes means for collecting first information associated with the device that includes location-related information, means for encrypting the first information using at least one session key, means for transmitting encrypted first information to at least one receiver prior to a triggering event, and means for transmitting the at least one session key to the at least one receiver after the triggering event.

Implementations of such a mobile device may include one or more of the following features. The means for transmitting the encrypted first information is further configured to transmit the encrypted first information according to a transmission schedule. The means for transmitting the encrypted first information is further configured to embed the encrypted first information into transmissions of second information that is separate from the first information. The triggering event includes at least one of a call initiated by the device and directed to an emergency number, receipt of a triggering signal, or a triggering action performed by a user of the device. The means for encrypting is configured to encrypt the first information according to a cipher suite, and the device further includes means for transmitting information relating to the cipher suite to the at least one receiver after the triggering event. The location-related information includes at least one of satellite navigation information, network cell identifiers, network cell strengths, wireless access point identifiers or wireless access point strengths. The first information further includes network-related information. The network-related information includes at least one of call records, data flow records or network topology observations associated with the device. The means for encrypting is configured to discard the at least one session key upon transmission of the at least one session key to the at least one receiver.

An example of a computer program product resides on a non-transitory processor-readable medium and includes processor-readable instructions configured to cause a processor to compile first information associated with a mobile device that includes location-related information, encrypt the first information using at least one session key in order to obtain encrypted first information, transmit the encrypted first information to at least one receiver prior to a triggering event, and transmit the at least one session key to the at least one receiver after the triggering event.

Implementations of such a computer program product may include one or more of the following features. The instructions configured to cause the processor to transmit the encrypted first information are further configured to cause the processor to transmit the encrypted first information according to a transmission schedule. The instructions configured to cause the processor to transmit the encrypted first information are further configured to cause the processor to embed the encrypted first information into transmissions of second information that is separate from the first information. The triggering event includes at least one of a call placed to an emergency number, receipt of a triggering signal, or a triggering action performed by a user of the mobile device. The instructions configured to cause the processor to encrypt the first information includes instructions configured for causing the processor to encrypt the first information based on a selected cipher suite, and the computer program product further includes instructions configured to cause the processor to transmit information relating to the selected cipher suite to the receiver after the triggering event. Instructions configured to cause the processor to discard the at least one session key upon transmitting the at least one session key. Instructions configured to cause the processor to disable a low battery charge shutoff mechanism associated with the mobile device after the triggering event. The first information further includes network-related information.

DETAILED DESCRIPTION

Figure 1:
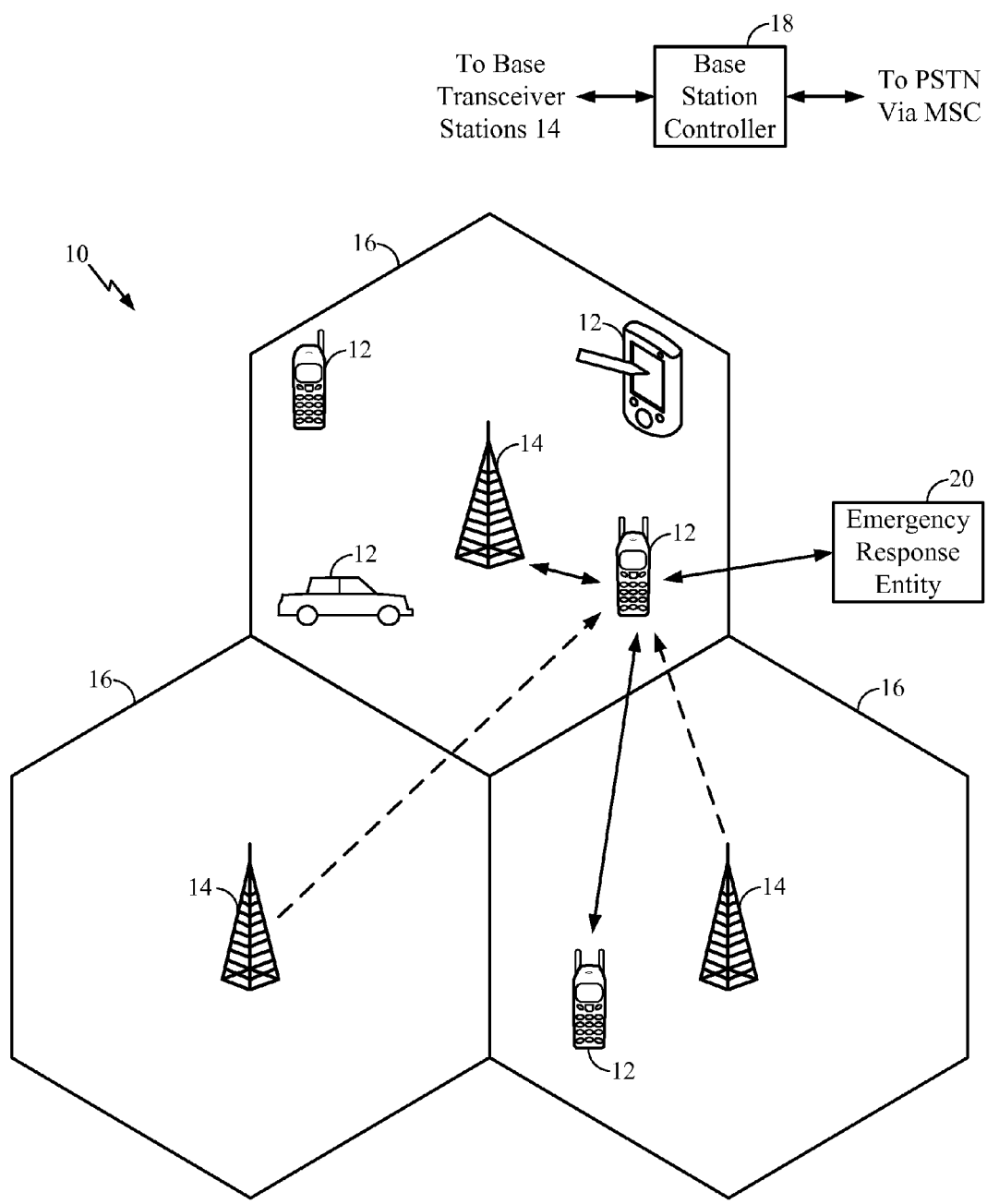
FIG. 1 is a schematic diagram of a wireless telecommunication system.

Items and/or techniques described herein may provide one or more of the following capabilities, as well as other capabilities not mentioned. Device resource usage during a specified event can be reduced, resulting in conservation of system bandwidth and device power. Information relevant to a given event can be transmitted to one or more designated receivers with increased security and privacy. Information can be transmitted prior to a triggering event with highly granular security to enable different subsets of the information to be readable by different entities. The risk of injury to persons or property involved in an emergency can be mitigated. While at least one item/technique-effect pair has been described, it may be possible for a noted effect to be achieved by means other than that noted, and a noted item/technique may not necessarily yield the noted effect.

Techniques are described herein for conducting bulk data transmissions (e.g., of emergency data or other event data) while preserving user privacy. For example, in a scenario such as an emergency scenario or the like, the user of a mobile device may wish to make available potentially useful data to various receivers (e.g., for provisioning of emergency services). These data may include location-based information, e.g., a time-based history of physical observations such as GPS data, cell identifiers and strengths, 802.11 access point identifiers and strengths, compass observations, accelerometer readings or the like. These data may additionally or alternatively include network-related information, such as call records, data flow records, network topology observations, etc.

Because many emergencies are intrinsically unpredictable, the user of a mobile device may desire to provide as much of the above-referenced information as possible. However, it is impractical in some emergency scenarios to transmit a significant body of data due to, for example, constraints on available power or signal coverage. Further, conservation of battery power generally increases significantly in importance once an emergency has arisen.

Accordingly, described herein are techniques by which data, such as emergency data or other appropriate data, are transmitted in an efficient manner in response to a triggering event. Data related to a triggering event, such as location-related data, network-related data, etc., are transmitted to a designated receiver(s) before the triggering event arises. In order to preserve user privacy with respect to the data, the data are encrypted and transmitted in encrypted form. Upon detecting a triggering event, information related to the encryption of the data, such as a session key and/or cipher suite utilized in the encryption of the data, is transmitted to the designated receiver. The receiver then decrypts the previously transmitted data using the encryption information. By providing mechanisms by which data can be transmitted prior to an emergency or other triggering event, transmission after the triggering event can be substantially limited to the encryption information, reducing the amount of power and other device resources needed for communication over the duration of the event. To further enhance user privacy, the encryption information can be configured such that a user is able to discard and/or change a session key or other encryption information utilized for pre-event transmissions as desired.

Referring to FIG. 1, a wireless communication system 10 includes various devices, such as mobile access terminals 12 (ATs), base transceiver stations (BTSs) 14 disposed in cells 16, and a base station controller (BSC) 18. The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 14 can wirelessly communicate with the ATs 12 via antennas. Each of the BTSs 14 may also be referred to as a base station, an access point, an access node (AN), a Node B, an evolved Node B (eNB), etc. The BTSs 14 are configured to communicate with the ATs 12 under the control of the BSC 18 via multiple carriers. Each of the BTSs 14 can provide communication coverage for a respective geographic area, here the respective cells 16. Each of the cells 16 of the BTSs 14 is partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 12 can be dispersed throughout the cells 16. The ATs 12 may be referred to as terminals, mobile stations, mobile devices, user equipment (UE), subscriber units, etc. The ATs 12 shown in FIG. 1 include mobile telephones, personal digital assistants (PDAs) and vehicular navigation and/or communication systems, but can also include wireless routers, other handheld devices, netbooks, notebook computers, etc.

The system can further include entities capable of responding to emergencies indicated by an AT 12. These entities can include, but are not limited to, a BTS 14 associated with the AT 12, other ATs 12, a dedicated emergency response entity 20, etc. The dedicated emergency response entity 20 can be an emergency dispatch center, a Public Safety Answering Point (PSAP), and/or any other entities that are capable of responding to emergencies signaled by an AT 12. Communication between an AT 12 and the emergency response entity 20 can be direct or indirect. In the case of indirect communication, the AT 12 can be routed to the emergency response entity 20 via a BTS 14 or another AT 12.

In the event of an emergency or other triggering event signaled by an AT 12, the AT 12 can provide information related to the event, the AT 12 or the network in the geographical area of the AT 12 to one or more entities with which the AT 12 communicates during the emergency. This information includes, e.g., location-related information, network-related information, etc., and can be collected from various sources such as the AT 12 itself, one or more BTSs 14 including a serving BTS 14 and/or various non-serving or neighboring BTSs 14, a satellite positioning system (SPS) or the like. The AT 12 can be configured to provide some or all related information to at least one predetermined receiver before, during or after the event.

Figure 2:
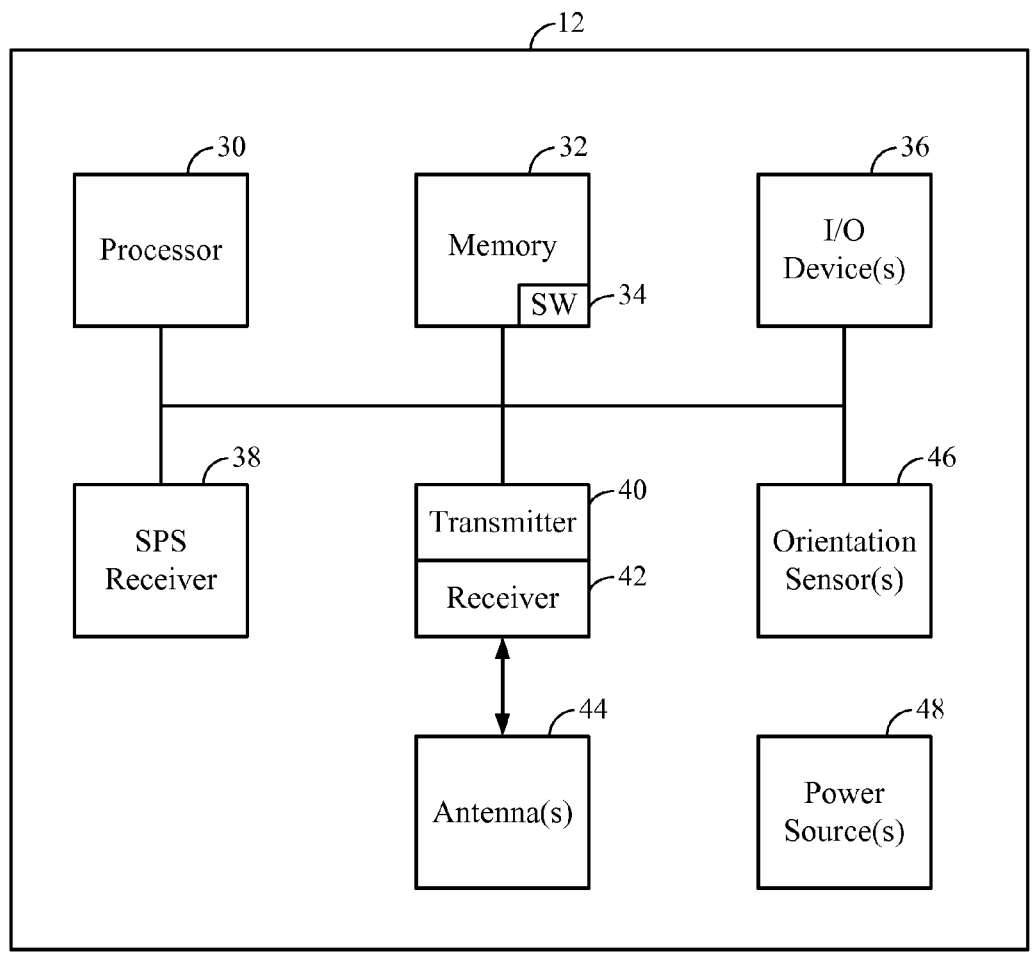
FIG. 2 is a block diagram of components of a mobile station shown in FIG. 1.

Referring also to FIG. 2, an example one of the ATs 12 comprises a computer system including a processor 30, memory 32 including software 34, input/output (I/O) device(s) 36 (e.g., a display, speaker, keypad, touch screen or touchpad, etc.), a SPS receiver 38, a transmitter 40 and receiver 42 associated with one or more antennas 44, orientation sensor(s) 46 (e.g., an accelerometer, compass, etc.), and a power source 48. The transmitter 40 and receiver 42 facilitate bi-directional communication with the BTSs 14 via the antennas 44. Here, the processor 30 is an intelligent hardware device, e.g., a central processing unit (CPU) such as those made by Intel® Corporation or AMD®, a microcontroller, an application specific integrated circuit (ASIC), etc. The memory 32 includes non-transitory storage media such as random access memory (RAM) and read-only memory (ROM). The memory 32 stores the software 34 which is computer-readable, computer-executable software code containing instructions that are configured to, when executed, cause the processor 30 to perform various functions described herein. Alternatively, the software 34 may not be directly executable by the processor 30 but is configured to cause the computer, e.g., when compiled and executed, to perform the functions.

The SPS receiver 38 includes appropriate equipment for monitoring navigation signals from satellites and determining position of the mobile device 12. The SPS receiver 38 can monitor navigation signals from satellites corresponding to any suitable satellite navigation system, such as GPS, GLONASS, the Beidou navigation system, the Galileo positioning system, etc. Here, the SPS receiver 38 includes one or more SPS antennas, and can either communicate with the processor 30 to determine location information or can use its own processor for processing the received satellite navigation signals to determine the location of the mobile device 12. Further, the SPS receiver 38 can communicate with other entities such as a position determination entity and/or the BTS 14 in order to send and/or receive assistance information for use in determining the location of the mobile device 12.

The orientation sensor(s) 46 are configured to collect data relating to motion and/or orientation of the mobile device 12 as well as changes in the motion and/or orientation of the mobile device 12 over time. The orientation sensor(s) 46 can provide information over time, e.g., periodically, such that present and past orientations and/or motion directions can be compared to determine changes in the motion direction and/or orientation of the mobile device 12.

The power source(s) 48 store and/or manage electrical power within the mobile device 12 to facilitate operation of the other components of the mobile device 12. The power source(s) 48 can include a battery, an alternating current (AC) to direct current (DC) adapter, etc. In the event that the power source(s) 48 include a rechargeable battery, a low battery charge shutoff mechanism can be employed to disable the battery when its charge level decreases below a low charge threshold in order to prevent the battery from discharging all of its stored power and consequentially becoming unable to recharge.

Figure 3:
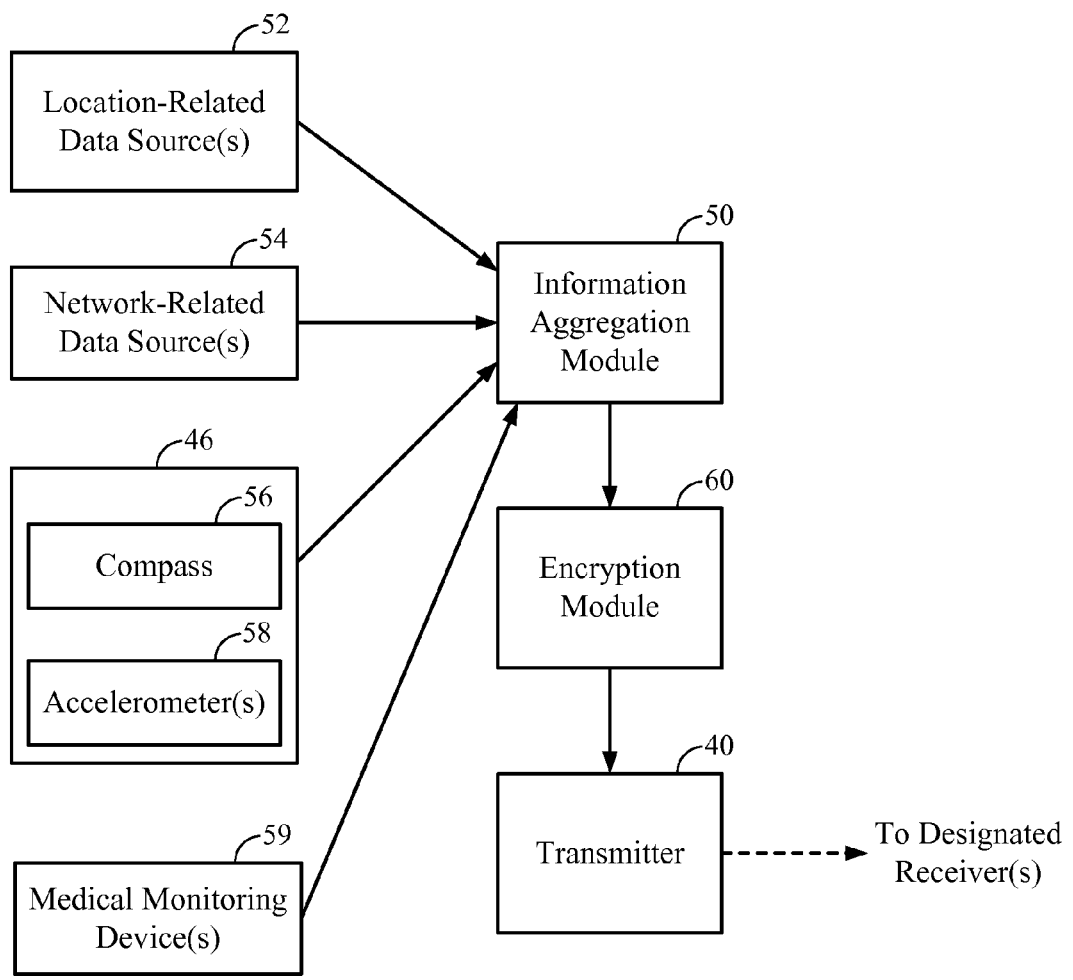
FIG. 3 is a partial functional block diagram of the mobile station shown in FIG. 2.

Within the mobile device 12, various forms of information are collected, processed and transmitted, as shown by FIG. 3. Here, an information aggregation module 50 collects location-related data from location-related data source(s) 52 and network-related data from network-related data source(s). Location-related data can include, for example, a time-based history of satellite navigation data (e.g., obtained via a SPS receiver 38), identifiers and/or strengths of network cells or access points (802.11 access points, etc.) obtained and/or measured by a receiver 42, etc. Network-related data can include, for example, call records, data flow records, network topology observations, etc.

The information aggregation module 50 can additionally obtain location-related data in the form of readings from one or more orientation sensors 46 including, e.g., a compass 56 and/or an accelerometer 58. The compass 56 provides data relating to the orientation of the mobile device 12 with respect to Earth, e.g., as an angle relative to magnetic north or true north. The information aggregation module 50 can utilize magnetic declination or other corrective metrics to convert an angle given by the compass 56 with respect to magnetic north to an angle with respect to true north, or vice versa. The accelerometer 58 provides information relating to the acceleration of the mobile device 12 with respect to Earth, e.g., based on an x-y-z coordinate system, a north-east-down (n-e-d) coordinate system, etc. The accelerometer 58 further obtains information relating to the direction of gravity relative to the mobile device 12, which can be used to aid in determining the orientation of the mobile device 12. The orientation sensors 46 can further include a gyroscope and/or any other suitable sensor mechanisms not shown in FIG. 3.

The information aggregation module 50 can further obtain data from other sources, such as one or more medical monitoring devices 59. Medical monitoring devices 59 can include any suitable device(s) that monitor the physical condition or health of a user associated with the medical monitoring devices 59. For example, medical monitoring devices 59 can include devices that monitor vital statistics, such as thermometers, blood pressure monitors, blood glucose monitors, heart rate monitors, etc. Medical monitoring devices can additionally or alternatively include devices that monitor the operating state of medical devices such as pacemakers, prostheses, hearing or visual aids, etc.

Information collected by the information aggregation module 50 is provided to an encryption module 60 that encrypts the collected information via one or more cryptographic processes. The encryption module 60 begins the process of generating encrypted information by selecting a cipher suite and a random session key Ks of a suitable length. The encryption module 60 can employ a variety of encryption techniques including, but not limited to, Advanced Encryption Standard (AES) algorithms such as AES-128, AES-128 with output feedback (AES-128-OFB), AES-192, AES-256, etc.; Data Encryption Algorithm (DEA) or Triple DEA; the Serpent or Twofish ciphers; other encryption techniques employing public key cryptography; or any other suitable technique(s). The encryption module 60 stores the selected session key and any associated intermediate cipher states in non-volatile memory 32, where the session key and cipher state(s) persist until explicitly replaced or erased.

The information aggregation module 50 and the encryption module 60 are implemented by the processor 30 in conjunction with the software 34 stored in the memory 32. These modules, as implemented by the processor 30 (e.g., by executing software algorithms), are configured to collect and process information as described above.

Figure 4:
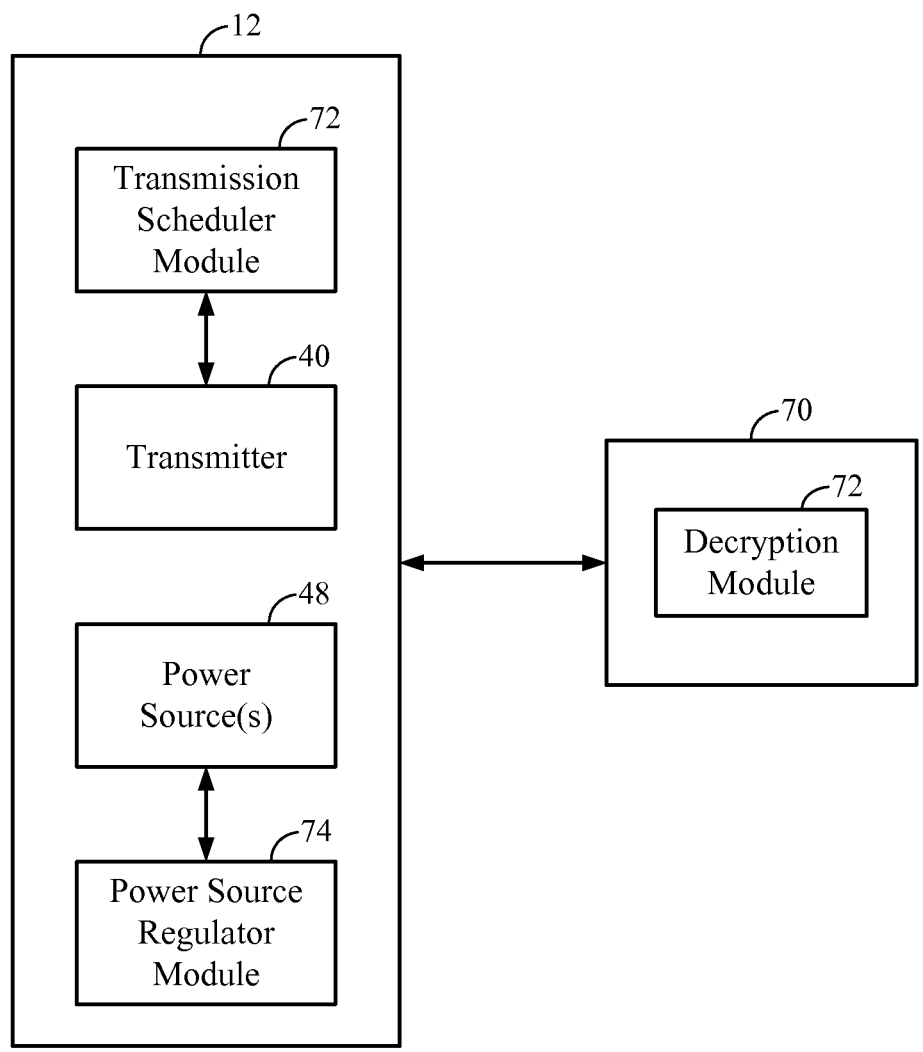
FIG. 4 is a partial functional block diagram of a system for securely transmitting event information to a designated receiver.

Upon encryption of the collected information via encryption module 60, some or all of the encrypted information is provided to a transmitter 40 for communication to one or more designated receivers (e.g., via antenna(s) 44) prior to a triggering event. As shown by FIG. 4, data encrypted by the mobile station 12, such as data that would be transmitted in an emergency or any other suitable data, are transmitted to one or more predetermined receivers 70 via a transmitter 40 at the mobile station 12 on an ongoing basis. The predetermined receivers 70 can include, for example, other mobile devices 12, base stations 14, emergency response entities 20, etc.

Communication by the transmitter 40 can be regulated in various manners by an associated transmission scheduler module 72 or other means. For example, the transmitter 40, with the aid of the transmission scheduler module 72, can regularly or continuously transmit information to the predetermined receiver(s) 70 and/or conduct intermittent transmission, e.g., based on a transmission schedule. Transmissions can be scheduled to occur at substantially all times (e.g., while the mobile device 12 is powered on), or alternatively these transmissions can be scheduled to occur upon satisfaction of certain criteria (e.g., battery charge level above a threshold, operation in an idle communication state, etc.). The transmitter can also opportunistically embed or piggyback some or all of the encrypted information onto transmissions of disparate information in order to reduce the overall power cost of transmitting the encrypted information.

Upon occurrence of a triggering event, the mobile device 12 begins transmitting information to the designated receiver(s) 70 that enable decryption of the previously transmitted encrypted data. This information can include the session key, the cipher suite, and/or any other information to enable a decryption module 72 or other mechanisms at the designated receiver(s) 70 to process the encrypted information transmitted previously. The mobile device 12 enters a decryption information transmission mode in response to a triggering event, which can be based on a variety of predetermined criteria. Triggering events can include, but are not limited to, the dialing of an emergency number (e.g., 911), receiving a designated signal (e.g., a Short Message Service (SMS) message or the like) from the network, a manual action by a user, other external triggers (e.g., corresponding to a court order, search warrant, etc.), or the like. The receipt of the session key and/or cipher suite enables the decryption module 72 at the designated receiver(s) 70 to access the data previously transmitted under that key and/or cipher suite. In turn, these data are used to optimize response to the triggering event. For the duration of the triggering event, the mobile device 12 continues to use the transmitted session key. Alternatively, the mobile device 12 can transmit data to the designated receiver(s) 70 in an unencrypted form during the triggering event.

The mobile device 12, via the encryption module 60, can encrypt information for transmission to one or more designated receivers 70 based on any suitable session key or combination of keys and/or any other mechanisms. For example, the encryption module 60 can encrypt a first portion or subset of information using a first key, a second portion or subset of information using a second key, and so on. The subsets encrypted using the various keys can be overlapping or distinct. The information is transmitted to one or more designated receiver 70 upon encryption as described above, and in response to a triggering event the appropriate key(s) and/or other decryption information is submitted to the designated receiver(s) 70 to enable decryption of the data.

By utilizing multiple keys or other decryption information, the mobile device 12 can enforce information privacy with improved granularity. For example, information intended for a first designated receiver 70 can be encrypted using a first key and transmitted, while information intended for a second designated receiver 70 can be encrypted using a different key and transmitted. Accordingly, in the event that all of the encrypted information is received by one or both of the designated receivers 70, access to the information by the respective designated receivers 70 can be controlled by individually communicating to each designated receiver 70 only the decryption information that is intended for the specific designated receiver 70. As another example, upon a triggering event associated with a device that has encrypted information using different session keys, all of the relevant session keys can be transmitted to a first, trusted receiver while a second receiver that is regarded as less trusted can be provided with only a subset of the session keys.

In addition to the techniques above in which an encryption module 60 generates a session key and encrypts data using the generated session key, the mobile device 12 can obtain session keys and/or other information in any other suitable manner. For example, the mobile device 12 can utilize an escrow key provided by a third party and/or any other suitable mechanisms for encrypting information.

In the event of an emergency or other triggering event, power and/or signal coverage at the mobile device 12 may be limited. In some cases, this can present an increased risk of harm to persons or property involved in the emergency due to, e.g., a signal outage, depletion of battery charge, etc., before decryption information can be communicated to the designated receiver(s) 70. Accordingly, a power source 48 at the mobile device 12, such as a battery or the like, can be managed by a power source regulator module 74 to increase the probability that decryption information will be successfully transmitted by the mobile device 12 during a triggering event. As complete discharge of a rechargeable battery adversely affects the ability of the battery to be recharged, batteries associated with a mobile device 12 generally utilize a low battery charge shutoff mechanism in order to ensure that the charge level of the battery does not drop below a threshold amount. In the event of an emergency or other triggering event, the power source regulator module 74 disables the low battery charge shutoff mechanism associated with the mobile device 12 to increase the opportunity of the mobile device 12 to communicate decryption information.

To further enhance privacy and data security, the mobile device 12 is configured to discard one or more session keys as desirable. The session keys can be discarded upon user request, in which case the previously transmitted data becomes irrecoverable. Alternatively, discarding of session keys can occur automatically, e.g., on a rolling schedule, to limit the data available to a designated receiver 70 when a triggering event is declared. Session keys can further be discarded when roaming to a new carrier and/or country, returning to normal operating mode after an emergency or other triggering event, etc. Discarding of session keys can occur manually or be based on predetermined criteria. These criteria can include, but are not limited to, recharging of the mobile device 12, receipt of a specified signal from the network, or the like.

The techniques described herein permit the effective transmission of a large body of historical data using minimal power and network resources, while preserving user privacy in non-emergency scenarios or the like. The techniques herein can be implemented in a variety of manners; for example, some or all of the functionality described herein can be implemented by a network carrier and provided to users as a network service. Other ways of implementing the techniques described herein are also possible.

Figure 5:
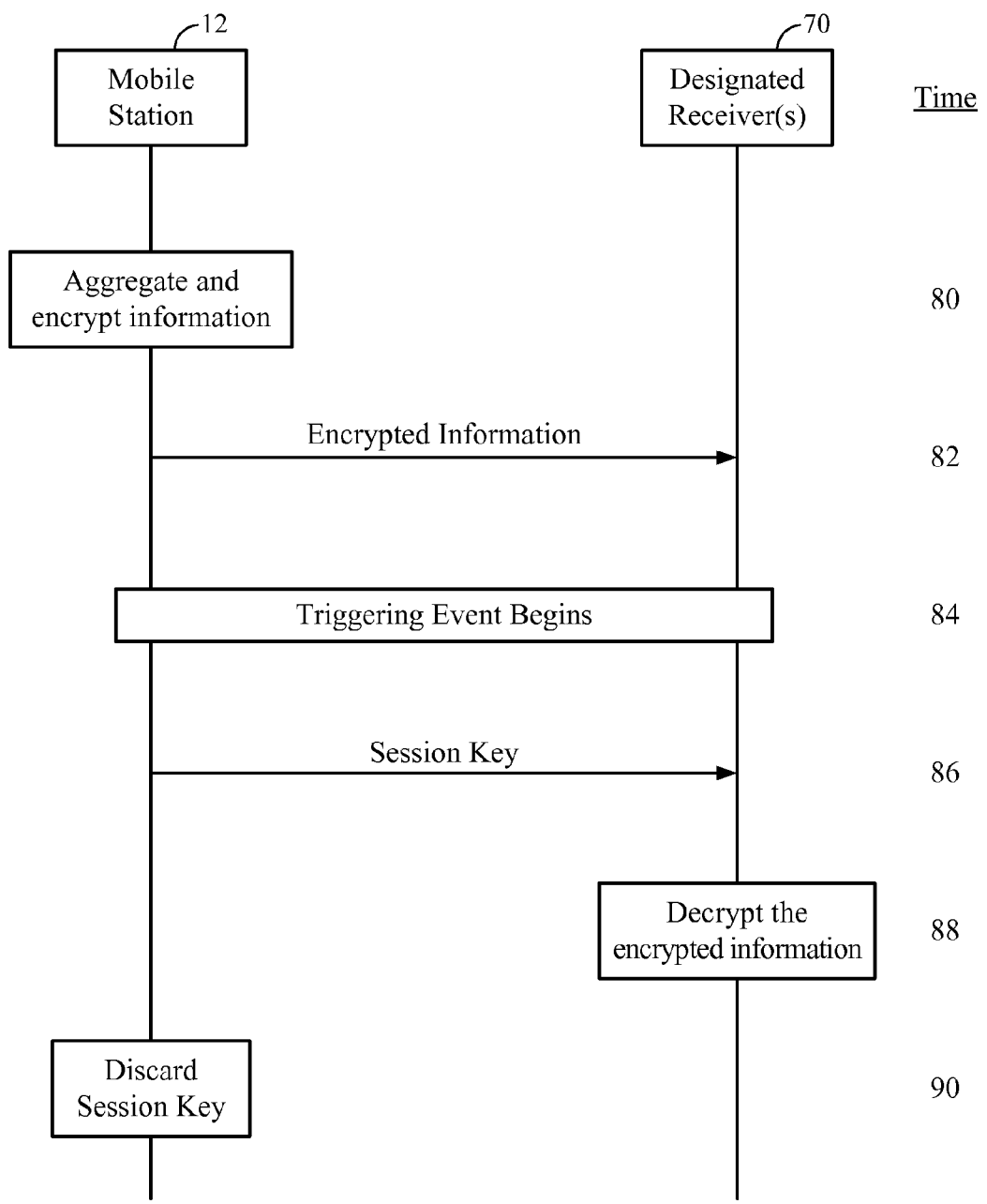
FIG. 5 is a graphical illustration of a technique for transmitting information relating to a given event with enhanced privacy.

An example technique for securely transmitting data from a mobile device 12 to one or more designated receivers 70 is illustrated by FIG. 5. At time 80, the mobile device 12 aggregates and encrypts information, e.g., using an information aggregation module 50 and an encryption module 60. At time 82, the encrypted information is transmitted to the designated receiver(s) 70. A triggering event begins at time 84, in response to which the mobile station 12 transmits a session key used for encrypting the information at time 86. The designated receiver(s) use the received session key to decrypt the previously transmitted encrypted information at time 88. At time 90, the mobile station 12 can then discard the session key that was previously utilized and transmitted.

Figure 6:
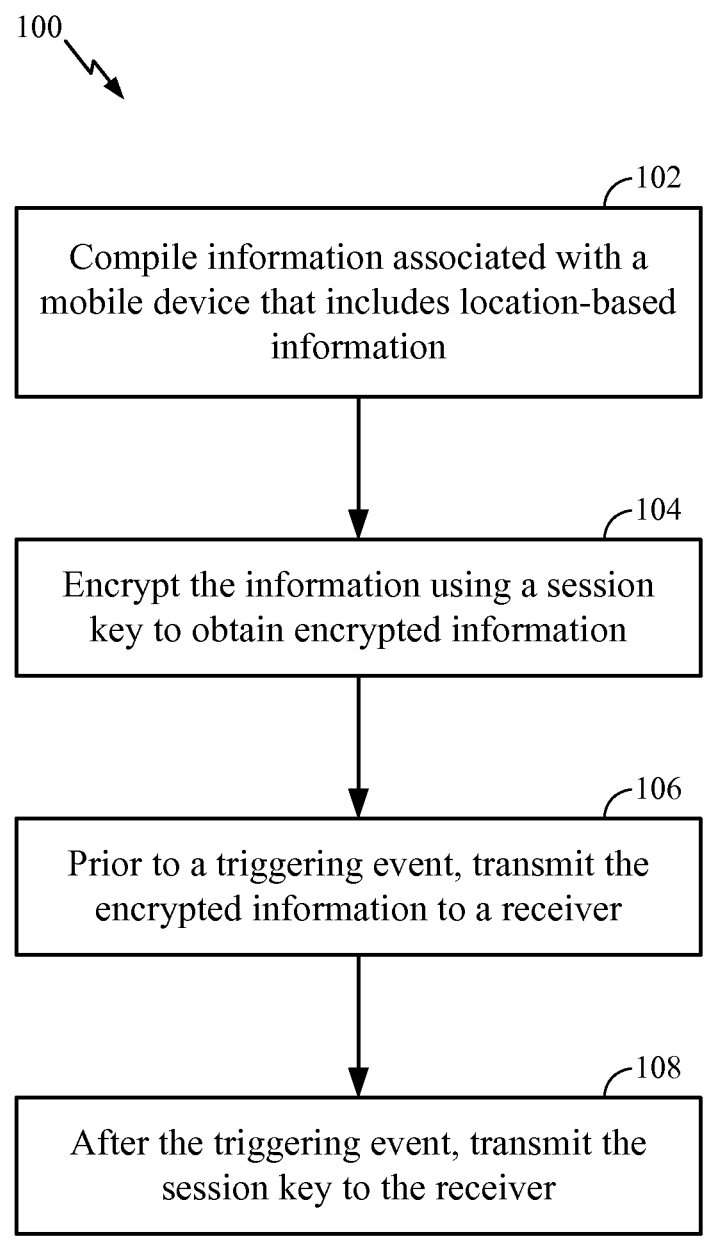
FIG. 6 is a block flow diagram of a process of securely transmitting information relating to a triggering event.

Referring to FIG. 6, with further reference to FIGS. 1-5, a process 100 of securely transmitting information relating to a triggering event includes the stages shown. The process 100 is, however, an example only and not limiting. The process 100 can be altered, e.g., by having stages added, removed, rearranged, combined, and/or performed concurrently. Still other alterations to the process 100 as shown and described are possible.

At stage 102, information associated with a mobile device 12, which includes location-based information (and optionally other forms of information, such as network-based information or the like), is compiled. This information can be compiled by, e.g., an information aggregation module 50 implemented by a processor 30 executing software 34 stored on a memory 32. The information can be obtained from sources including, but not limited to, the memory 32, a SPS receiver 38, a receiver 42 and/or associated antennas 44, orientation sensors 46, etc.

At stage 104, the information compiled at stage 102 is encrypted using a session key, resulting in encrypted information. The information is encrypted using, e.g., an encryption module 60 implemented by a processor 30 executing software 34 stored on a memory 32. In addition, encryption can be conducted based on additional information, such as a cipher suite or the like.

At stage 106, the encrypted information is transmitted to a designated receiver 70 prior to a triggering event (e.g., an emergency event and/or other pre-designated event). After the triggering event, the session key used in encrypting the information is transmitted to the designated receiver at stage 108. In the event that additional information, such as a cipher suite, is used in encrypting the information, this additional information can optionally also be transmitted to the designated receiver 70 at stage 108.

One or more of the components, steps, features and/or functions illustrated in FIGS. 1, 2, 3, 4, 5, and/or 6 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, and/or 4 may be configured to perform one or more of the methods, features, or steps described in FIGS. 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Information, arguments, parameters, data, etc. may be passed, forwarded, or transmitted via any suitable means including memory sharing, message passing, token passing, network transmission, etc.

The terms "machine-readable medium," "computer-readable medium," and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium," "computer-readable medium," and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A mobile device for transmitting encrypted data, the mobile device comprising:
    an information aggregation circuit configured to compile first information associated with the device, the first information comprising location-related information;
    an encryption circuit communicatively coupled to the information aggregation circuit and configured to encrypt the first information using at least one session key to obtain encrypted first information; and
    a transmitter communicatively coupled to the encryption circuit and configured to transmit from the mobile device to at least one receiver of at least one other device both: 1) the encrypted first information prior to a triggering event, and 2) the at least one session key, used by the encryption circuit of the mobile device to encrypt the first information, after the triggering event in order to decrypt at the at least one receiver of the at least one other device, using the at least one session key, the encrypted first information such that the at least one receiver of the at least one other device can decrypt the encrypted first information only upon occurrence of the triggering event so that user privacy is preserved until the occurrence of the triggering event.

2. The mobile device of claim 1 wherein the transmitter is further configured to regularly transmit the encrypted first information.

3. The mobile device of claim 2 wherein the transmitter is further configured to conduct an automatic on-demand transmission of the at least one session key in response to the triggering event.

4. The mobile device of claim 1 wherein the transmitter is further configured to transmit the encrypted first information according to a transmission schedule.

5. The mobile device of claim 1 wherein the transmitter is further configured to embed the encrypted first information into transmissions of second information separate from the first information.

6. The mobile device of claim 1 wherein the triggering event comprises at least one of a call initiated by the mobile device and directed to an emergency number, receipt of a triggering signal, or a triggering action performed by a user of the mobile device.

7. The mobile device of claim 1 wherein the receiver comprises at least one of a disparate mobile device, a base station or an emergency response entity.

8. The mobile device of claim 1 wherein the encryption circuit is further configured to encrypt the first information according to a cipher suite and the transmitter is further configured to transmit information relating to the cipher suite to the at least one receiver after the triggering event.

9. The mobile device of claim 1 wherein the information aggregation circuit is further configured to compile at least one of satellite navigation information, network cell identifiers, network cell strengths, wireless access point identifiers, wireless access point strengths, compass readings or accelerometer readings.

10. The mobile device of claim 1 wherein the first information further comprises network-related information.

11. The mobile device of claim 10 wherein the network-related information comprises at least one of call records, data flow records or network topology observations associated with the mobile device.

12. The mobile device of claim 1 wherein the information aggregation circuit is further configured to compile information from one or more medical monitoring sensors associated with a user of the mobile device.

13. The mobile device of claim 1 wherein the transmitter is further configured to transmit the encrypted first information if the mobile device is in an idle state or if a battery charge level of the mobile device is above a threshold.

14. The mobile device of claim 1 wherein the encryption circuit is further configured to discard the at least one session key upon transmission of the at least one session key to the at least one receiver.

15. The mobile device of claim 14 wherein the encryption circuit is further configured to encrypt the first information using a second session key in response to discarding of a first session key, wherein the first session key differs from the second session key.

16. The mobile device of claim 1 wherein the encryption circuit is configured to encrypt a first subset of the first information using a first session key and to encrypt a second subset of the first information using a second session key, thereby obtaining a first encrypted information subset and a second encrypted information subset, respectively.

17. The mobile device of claim 16 wherein the transmitter is configured to transmit the first encrypted information subset to a first receiver and to transmit the second encrypted information subset to a second receiver.

18. The mobile device of claim 1, wherein the mobile device is configured to discard the at least one session key prior to the triggering event without transmitting the at least one session key to the at least one receiver of the at least one other device.

19. The mobile device of claim 18, wherein the mobile device is configured to automatically discard the at least one session key based on a rolling schedule to limit data available at the at least one other device.

20. A method for transmitting encrypted data, the method comprising:
   compiling by a processor-based device of a mobile device first information associated with the mobile device, the first information comprising location-related information;
   encrypting by the processor-based device the first information using at least one session key to obtain encrypted first information;
   prior to a triggering event, transmitting by the processor-based device of the mobile device the encrypted first information to at least one receiver of at least one other device; and
   after the triggering event, transmitting by the processor-based device of the mobile device the at least one session key, used by the processor-based device to encrypt the first information, to the at least one receiver of the at least one other device in order to decrypt at the at least one receiver of the at least one other device, using the at least one session key, the encrypted first information such that the at least one receiver of the at least one other device can decrypt the encrypted first information only upon occurrence of the triggering event so that user privacy is preserved until the occurrence of the triggering event.

21. The method of claim 20 wherein transmitting the encrypted first information comprises regularly transmitting the encrypted first information.

22. The method of claim 20 wherein transmitting the encrypted first information comprises transmitting the encrypted first information according to a transmission schedule.

23. The method of claim 20 wherein transmitting the encrypted first information comprises embedding the encrypted first information into transmissions of second information that is separate from the first information and the encrypted first information.

24. The method of claim 20 wherein the triggering event comprises at least one of a call placed to an emergency number, receipt of a triggering signal, or a triggering action performed by a user of the mobile device.

25. The method of claim 20 wherein encrypting the first information comprises encrypting the first information based on a selected cipher suite and the method further comprises, after the triggering event, transmitting information relating to the selected cipher suite to the at least one receiver.

26. The method of claim 20 wherein the location-related information comprises at least one of satellite navigation data, network cell identifiers, network cell strengths, wireless access point identifiers, wireless access point strengths, compass readings or accelerometer readings.

27. The method of claim 20 wherein the first information further comprises network-related information.

28. The method of claim 27 wherein the network-related information comprises at least one of call records, data flow records or network topology observations.

29. The method of claim 20 wherein transmitting the encrypted first information comprises transmitting the encrypted first information if the mobile device is in an idle state or if a battery charge level of the mobile device is above a threshold.

30. The method of claim 20 further comprising discarding the at least one session key upon transmitting the at least one session key.

31. The method of claim 20 further comprising, after the triggering event, disabling a low battery charge shutoff mechanism associated with the mobile device.

32. The method of claim 20 wherein encrypting the first information comprises:
   encrypting at least a first portion of the first information using a first session key; and
   encrypting at least a second portion of the first information using a second session key.

33. The method of claim 32 wherein transmitting the at least one session key comprises:
   transmitting the first session key to at least a first receiver; and transmitting the second session key to at least a second receiver.

34. A mobile device for transmitting encrypted data, the mobile device comprising:
   means for collecting first information associated with the mobile device, the first information comprising location-related information;
   means for encrypting the first information using at least one session key to obtain encrypted first information;
   means for transmitting the encrypted first information to at least one receiver of at least one other device prior to a triggering event; and
   means for transmitting by the mobile device the at least one session key, used by the means for encrypting of the mobile device to encrypt the first information, to the at least one receiver of the at least one other device after the triggering event in order to decrypt at the at least one receiver of the at least one other device, using the at least one session key, the encrypted first information such that the at least one receiver of the at least one other device can decrypt the encrypted first information only upon occurrence of the triggering event so that user privacy is preserved until the occurrence of the triggering event.

35. The mobile device of claim 34 wherein the means for transmitting the encrypted first information is further configured to transmit the encrypted first information according to a transmission schedule.

36. The mobile device of claim 34 wherein the means for transmitting the encrypted first information is further configured to embed the encrypted first information into transmissions of second information that is separate from the first information.

37. The mobile device of claim 34 wherein the triggering event comprises at least one of a call initiated by the mobile device and directed to an emergency number, receipt of a triggering signal, or a triggering action performed by a user of the mobile device.

38. The mobile device of claim 34 wherein the means for encrypting is configured to encrypt the first information according to a cipher suite and the mobile device further comprises means for transmitting information relating to the cipher suite to the at least one receiver after the triggering event.

39. The mobile device of claim 34 wherein the location-related information comprises at least one of satellite navigation information, network cell identifiers, network cell strengths, wireless access point identifiers or wireless access point strengths.

40. The mobile device of claim 34 wherein the first information further comprises network-related information.

41. The mobile device of claim 40 wherein the network-related information comprises at least one of call records, data flow records or network topology observations associated with the mobile device.

42. The mobile device of claim 34 wherein the means for encrypting is configured to discard the at least one session key upon transmission of the at least one session key to the at least one receiver.

43. A computer program product, for transmitting encrypted data, embodied on a non-transitory processor-readable storage medium and comprising processor-readable instructions configured, when executed on a processor, to cause the processor to:
   compile first information associated with a mobile device, the first information comprising location-related information;
   encrypt the first information using at least one session key in order to obtain encrypted first information;
   transmit by the mobile device the encrypted first information to at least one receiver of at least one other device prior to a triggering event; and transmit by the mobile device the at least one session key, used by the processor to encrypt the first information, to the at least one receiver of the at least one other device after the triggering event in order to decrypt at the at least one receiver of the at least one other device, using the at least one session key, the encrypted first information such that the at least one receiver of the at least one other device can decrypt the encrypted first information only upon occurrence of the triggering event so that user privacy is preserved until the occurrence of the triggering event.

44. The computer program product of claim 43 wherein the instructions configured to cause the processor to transmit the encrypted first information are further configured to cause the processor to transmit the encrypted first information according to a transmission schedule.

45. The computer program product of claim 43 wherein the instructions configured to cause the processor to transmit the encrypted first information are further configured to cause the processor to embed the encrypted first information into transmissions of second information that is separate from the first information.

46. The computer program product of claim 43 wherein the triggering event comprises at least one of a call placed to an emergency number, receipt of a triggering signal, or a triggering action performed by a user of the mobile device.

47. The computer program product of claim 43 wherein the instructions configured to cause the processor to encrypt the first information comprises instructions configured for causing the processor to encrypt the first information based on a selected cipher suite and the computer program product further comprises instructions configured to cause the processor to transmit information relating to the selected cipher suite to the at least one receiver after the triggering event.

48. The computer program product of claim 43 further comprising instructions configured to cause the processor to discard the at least one session key upon transmitting the at least one session key.

49. The computer program product of claim 43 further comprising instructions configured to cause the processor to disable a low battery charge shutoff mechanism associated with the mobile device after the triggering event.

50. The computer program product of claim 43 wherein the first information further comprises network-related information.

* * * * *